United States Patent
Dirschl et al.

[11] Patent Number: 6,080,830
[45] Date of Patent: Jun. 27, 2000

[54] PRODUCTS OF THE REACTION BETWEEN ISOCYANATES AND HYDROXYL COMPOUNDS FOR TEXTILE FINISHING

[75] Inventors: Franz Dirschl, Augsburg; Franz Mosch, Diedorf; Theodor Angele, Wertingen; Wilhelm Artner, Motzenhofen; Edeltraud Schidek, Augsburg; Erich Rössler, Stadtbergen-Leitershofen, all of Germany

[73] Assignee: Ciba Specialty Chemicals Corporation, Tarrytown, N.Y.

[21] Appl. No.: 09/060,689

[22] Filed: Apr. 15, 1998

[30] Foreign Application Priority Data

Apr. 14, 1997 [DE] Germany .............................. 197 15 416

[51] Int. Cl.[7] .................................................. C08G 18/80
[52] U.S. Cl. ......................... 528/45; 252/182.22; 528/70; 6/115.6
[58] Field of Search ........................ 252/182.22; 528/45, 528/70

[56] References Cited

U.S. PATENT DOCUMENTS

| | | | |
|---|---|---|---|
| 4,098,933 | 7/1978 | Burkhardt | 427/379 |
| 4,531,946 | 7/1985 | Christie et al. | 8/192 |
| 4,540,765 | 9/1985 | Koemm et al. | 528/45 |
| 4,761,337 | 8/1988 | Guagliardo et al. | 428/425.8 |
| 4,831,098 | 5/1989 | Watanabe et al. | 528/45 |
| 4,834,764 | 5/1989 | Deiner et al. | 8/115.64 |
| 5,451,305 | 9/1995 | Ott et al. | 204/181.7 |
| 5,508,370 | 4/1996 | Reiff et al. | 528/45 |

*Primary Examiner*—Rachel Gorr
*Attorney, Agent, or Firm*—Kevin T. Mansfield

[57] ABSTRACT

Products which are produced by reaction of diisocyanates with di- or polyhydric alcohols and/or with one or more mono- and/or diethers of such alcohols and subsequent reaction with organic amines containing two or more alcoholic hydroxyl groups and subsequent blocking of free isocyanate groups are suitable for the finishing of fiber materials, in particular in the form of aqueous dispersions as extenders for use in combination with polymers containing perfluoroalkyl groups for the oil-, water- and soil-repellent finishing of fiber materials.

20 Claims, No Drawings

PRODUCTS OF THE REACTION BETWEEN ISOCYANATES AND HYDROXYL COMPOUNDS FOR TEXTILE FINISHING

The invention relates to products containing blocked isocyanate groups which are obtainable by reaction of products containing isocyanate groups with hydroxyl compounds and subsequently blocking the resultant products and to the use thereof in the treatment of fiber materials.

Blocked isocyanates prepared by the reaction of polyisocyanates with polyhydroxyl compounds and subsequent blocking of the NCO groups which are still free using blocking agents are known. They are described, for example, in EP-A 196 309, EP-A 262 069 and WO 92/00358. Blocked isocyanates prepared by reaction of polyisocyanates with nitrogen-containing polyhydroxyl compounds and subsequent blocking are also known and described in EP-A 196 309. The reaction of polyisocyanates with polyols and with nitrogen-containing hydroxyl compounds is also known and described, for example, in EP-A 262 069 and EP-A 537 578. It is also known, in the oil- and water-repellent finishing of fiber materials, to use extenders in combination with polymers containing perfluoroalkyl radicals, i.e. substances which enhance the effects. The use of blocked isocyanates and blocked low molecular weight polyurethanes as extenders is also known and described, for example, in EP-A 196 309 and EP-A 537 578.

As well as advantages, the prior art blocked isocyanates do, however, also have disadvantages. For example, they are not very suitable for achieving the desired level of effectiveness on fiber materials made of certain fibers or certain fiber mixtures. The permanence of the effects achieved with the known blocked isocyanates after washing and dry-cleaning processes and the abrasion resistance of the finished fiber materials are not ideal either.

The object of the present invention was to provide compositions based on blocked isocyanates which are suitable for diverse uses, preferably as extenders together with polymers containing perfluoroalkyl groups, on fiber materials, i.e. are suitable both on materials made of different types of fiber and also for producing various effects.

This object has been achieved by a composition obtainable by the following process steps:

a) reaction of a diisocyanate or a mixture of diisocyanates (component I) with one or more alcohols having from 2 to 8 carbon atoms and/or with one or more mono- and/or diethers of such alcohols (component II), these alcohols or ethers thereof having at least two alcoholic hydroxyl groups and no more than two C—O—C bonds, and the reaction being carried out such that the product formed still has free isocyanate groups, b) reaction of the product obtained in step a) with an organic amine containing two or more alcoholic hydroxyl groups, or a mixture of such amines, the reaction being carried out such that the product formed still has free isocyanate groups, with the proviso that at least one alcohol, one ether or one amine from amongst the alcohols, ethers and amines used in step a) and/or b) contains three or more alcoholic hydroxyl groups, c) blocking the free isocyanate groups of the product obtained in step b) by reaction with a blocking agent, d) if required, dispersing the product obtained after step c) in water and adjusting the pH.

The compositions according to the invention have the following advantages:
1. They can be used on a variety of fiber materials.
2. They are suitable for achieving different finish effects.
3. The finished fiber materials have very good permanence of effects after washing and dry-cleaning processes.

The diisocyanates used in step a) for preparing the compositions according to the invention are known and described, for example, without laying claim to completeness, in EP-A 537 578. Preference is given to aromatic diisocyanates. Particularly suitable diisocyanates are diphenylmethane diisocyanates of the general formula (III)

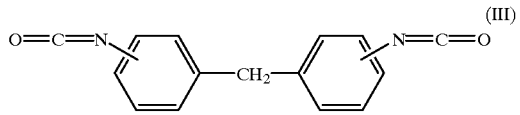

in particular, diphenylmethane 4,4'-diisocyanate, or toluylene diisocyanates of the general formula (IV)

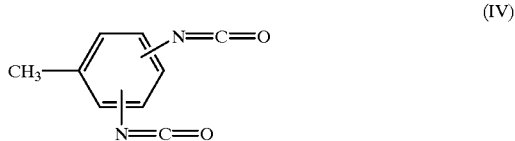

in which case it is possible to use either individual isomers or mixtures of isomeric diphenylmethane or toluylene diisocyanates.

The reaction with the diisocyanates is carried out using step a) alcohols having from 2 to 8 carbon atoms or mono- or diethers of such alcohols or mixtures of these alcohols and their mono- or diethers. The alcohols and the mono- or diethers must have at least two free hydroxyl groups and no more than two C—O—C bonds.

For the preparation of the compositions according to the invention in step a), suitable di- or polyhydric alcohols having from 2 to 8 carbon atoms are known. Aliphatic, either linear or branched, alcohols are suitable and preferred. Dihydric alcohols, for example ethylene glycol, 1,3-propylene glycol, 1,2-propylene glycol, 1,4-butanediol, 1,5-pentanediol, neopentyl glycol and 1,6-hexanediol are highly suitable. Tri- and polyhydric alcohols, for example glycerol, trimethylolpropane and pentaerythritol, are highly suitable. Of the polyhydric alcohols, the trihydric alcohols are preferred. 1,2-propylene glycol and 1,1,1-trimethylolpropane are particularly suitable. Mono- or diethers which can be used in step a) are also known. They consist, for example, of two or three molecules, linked to one another by ether linkages, of di- or polyhydric alcohols and have at least two free hydroxyl groups and no more than two C—O—C bonds (ether alcohols). Monoethers, for example diethylene glycol or dipropylene glycol, and diethers, for example triethylene glycol or tripropylene glycol, are highly suitable. In the reaction with a plurality of components having hydroxyl functions—alcohols and/or ethers—in step a), they can be reacted with the diisocyanate component either as a mixture or else in stages.

Organic amines having two or more alcoholic hydroxyl groups which can be used for the reaction in step b) are known. In the preparation of the compositions according to the invention, preference is given to using secondary or tertiary amines in step b), although it is also possible to use primary amines whose organic radical which is bonded to nitrogen contains at least two alcoholic hydroxyl groups. Examples of highly suitable secondary amines are diethanolamine and dipropanolamine. Tertiary amines of the general formula (A) are preferably suitable, $$R_{3-y}N(R'—OH)_y \qquad (A)$$

in which R is an alkyl radical having from 1 to 18, preferably from 1 to 4, carbon atoms, R' is a linear or branched alkylene radical having from 2 to 4 carbon atoms and y is 2 or 3, including alkoxylated amines, for example N-methyl-, N-dodecyl- or N-stearyldiethanolamine, and also triethanolamine.

For the preparation of the compositions according to the invention, it is important that the reaction products obtained have a certain degree of branching. This is achieved by at least one of the compounds reacted with isocyanate groups in step a) or b) (alcohol, ether, amine) containing at least three alcoholic hydroxyl groups. For example, propylene glycol is used in step a) and triethanolamine in step b), or trimethylolpropane is used in step a) and N-methyldiethanolamine in step b). By varying the reaction conditions, e.g. degree of branching, it is possible to avoid gelation.

Step a) is preferably carried out with quantities of diisocyanates and alcohols and/or ethers such that between 0.1 and 0.5 equivalents of alcoholic hydroxyl groups are used per equivalent of isocyanate groups. When this is the case, step b) is then preferably carried out with quantities of reaction products from step a) and alcoholic hydroxyl group-containing amines such that between 0.05 and 0.5 equivalents of alcoholic hydroxyl groups are used per equivalent of isocyanate groups used in step a). Step a) and step b) are carried out with quantities of diisocyanates, alcohols and/or ethers and amines such that the reaction products obtained after step a) and after step b) still contain free isocyanate groups. The quantities of diisocyanate, alcohol and/or ethers and amine are preferably selected such that the sum of the equivalents of alcoholic hydroxyl groups used in step a) and b) does not exceed 0.7 per equivalent of isocyanate groups used in step a). Particular preference is given to using from 0.3 to 0.5 equivalents per equivalent of isocyanate groups in step a) and, when this is the case, using from 0.05 to 0.3 equivalents of alcoholic hydroxyl groups in step b).

Preference is given to compositions according to the invention in which 1,2-propylene glycol or a mixture of 1,2-propylene glycol and one or more mono- or diethers of 1,2-propylene glycol, each of these ethers having two hydroxyl groups, are used as component II in step a). Particular preference is given to compositions according to the invention in which a diisocyanate or a mixture of diisocyanates in the presence of a reaction product containing free isocyanate groups, which is obtainable by reaction of this diisocyanate or diisocyanate mixture with a dihydric alcohol or with a mixture of such an alcohol and mono- and/or diethers of such an alcohol, is used as component I in step a) for the reaction with component II. Particular preference is also given to compositions according to the invention in which a mixture of a diisocyanate or a reaction product containing free isocyanate groups, which is obtainable by reaction of this diisocyanate with 1,2-propylene glycol or with a mixture of 1,2-propylene glycol and one or more mono- or diethers of 1,2-propylene glycol, is used as component I in step a). Particular preference is also given to compositions according to the invention in which the mixture of diisocyanate and its reaction product has been obtained by reaction of diisocyanate with 1,2-propylene glycol or with a mixture of 1,2-propylene glycol and one or more mono- or diethers of 1,2-propylene glycol in a ratio of one equivalent of isocyanate groups to from 0.1 to 0.3 equivalents of alcoholic hydroxyl groups.

Particular preference is also given to compositions according to the invention in which, in step a), component I is firstly reacted with a tri- or polyhydric alcohol to give a product which still contains free isocyanate groups, and the resulting product is then reacted, in step b), with a compound of the formula (B), $$R''N(CH_2CH_2OH)_2 \qquad (B)$$

in which R" is an alkyl group having from 1 to 4 carbon atoms, to give a product which still contains free isocyanate groups.

The blocking agents used to block the remaining free isocyanate groups in step c) are known and described for example, without laying claim to completeness, in EP-A 537 578. Highly suitable blocking agents are ketone oximes, butanone oxime being particularly suitable. Step c) is carried out with quantities of blocking agents and under conditions such that the obtained reaction products essentially no longer have free isocyanate groups.

The reaction according to step a), b) and/or the blocking according to step c) is advantageously carried out in homogeneous liquid phase, preferably in a solvent. Suitable solvents are polar, aprotic, organic solvents, as, for example, described in EP-A 537 578. Examples of highly suitable solvents are esters of organic acids or ethers. Particularly suitable solvents are lower ketones which are virtually insoluble in water, preferably methyl isobutyl ketone. The organic solvents can be removed again from the compositions according to the invention, e.g. by distillation, preferably after an aqueous dispersion which comprises the composition has been prepared.

The reaction according to step a) is advantageously carried out in the presence of a catalyst in order to achieve an appropriate reaction rate. It is possible to use any catalysts which are suitable for the reaction of isocyanate groups with alcoholic hydroxyl groups. Examples of suitable catalysts are tertiary amines, including 1,4-diazabicyclo[2.2.2]-octane. Particularly suitable catalysts are organotin compounds, for example dibutyltin dilaurate, dibutyltin dioctanoate, dioctyltin dilaurate or tin octanoate. For the reaction in step b) or c), the presence of a catalyst is not required, although the catalyst used in the reaction in step a) is advantageously not removed from the product obtained in step a) before the reactions in step b) and c) are carried out.

The reaction in step a) and b) is normally carried out at a temperature of from 0 to 150° C. and the blocking according to step c) at a temperature of from 0 to 100° C. The reaction in step a), b) and c) is preferably carried out at a temperature of from 20 to 90° C., particularly preferably at from 40 to 80° C.

It is advantageous, especially with regard to handling and also the environment, to prepare and use the compositions according to the invention as aqueous dispersions. For this purpose, the reaction product obtained in step c) is dispersed in water. Since the reaction products obtained in step c) normally do not form stable dispersions with water, suitable dispersants are used in concentrations familiar to the person skilled in the art for this purpose. Suitable dispersants are nonionic surfactants, for example alkoxylated fatty alcohols, fatty acids and sorbitan esters and also ethylene oxide-propylene oxide block copolymers and amine oxides. Suitable dispersants are also cationic surfactants, for example tetraalkyl-ammonium salts or ethoxylated alkylamines and salts thereof, and also alkoxylated and quaternized alkylamines. A particularly suitable dispersant in a number of cases is ethoxylated castor oil having, on average, from 10 to 50, particularly preferably from 25 to 40, ethylene oxide units. Suitable dispersants can either be used on their own or also as mixtures of two or more dispersants. Examples of highly suitable dispersants are mixtures of ethoxylated castor oil and alkoxylates of fatty alcohols or of fatty acids. The pH can be adjusted during or after dispersion to the range which is optimum for the stability of the dispersion and for the intended use. The pH of the dispersions is normally adjusted to a value of from 1.5 to 9, preferably from 2.5 to 4. The pH can be adjusted using agents known to the person skilled in the art, for example organic or inorganic acids.

The dispersions are normally prepared in the following way: water, a dispersant or a dispersant mixture and, if desired, further components are homogenized, and the reaction product obtained in step c) and, if desired, the acid used to adjust the pH are finely distributed in this mixture using a mechanical high-speed stirrer. It is also possible to add the acid to the water/dispersant mixture before the reaction product is added. A mixture can be prepared by using water, dispersants, reaction product, acid and other components in any sensible order. The resulting mixture can be converted into a stable, finely divided dispersion using a high-pressure homogenizer at a pressure of from 100 to 500 bar, preferably from 200 to 300 bar. Either mixing or high-pressure homogenization can be carried out at normal or elevated temperature.

At temperatures which are too low, there is the risk of product precipitation from the dispersion, and the maximum temperature is determined by the boiling point of the water/solvent mixture. Step d) is preferably carried out at 20–40° C., the high-pressure homogenization advantageously with cooling. After the dispersion has been obtained, any solvent present is preferably removed, for example by distillation, if desired under reduced pressure. In addition to the advantages of environmental friendliness and an increased flash point, solvent-free dispersions also often have the advantage of increased stability.

The novel compositions obtained in step c) or d) are very highly suitable for treating fiber materials, in particular for treating woven or knitted textile sheetlike structures. Suitable fiber materials are either those made from native or regenerated cellulose, and also fibers of animal origin, preferably wool, and also those made from synthetic organic fibers, for example polyester fibers, and also mixtures thereof. If desired, it is additionally possible to use further products suitable for textile finishing, for example cellulose crosslinkers, fabric softeners, silicone elastomers or flame retardants, preferably by adding these products to the dispersions of the compositions according to the invention. Suitable products which can additionally be used for this purpose are known to the person skilled in the art. Examples include: ethyleneurea derivatives as cellulose crosslinkers, silicone and/or modified polyethylene-comprising dispersions as fabric softeners, phosphorus-containing products for flame retardant finishing. The compositions according to the invention are preferably suitable for use in combination with fluorine-containing polymers for the oil-, water- and soil-repellent finishing of fiber materials. The mixing ratio of fluorine-containing polymers to the compositions according to the invention, based on water- and solvent- and also additive-free active substances in each case, can be from 1:0.03 to 1:1.5, preferably from 1:0.3 to 1:0.75. Fluorine-containing polymers which are suitable for achieving oil-, water- and soil-repellent finishes are known to the person skilled in the art. Examples which may be mentioned are polyurethanes containing perfluoroalkyl acrylic polymers and perfluoroalkyl groups. The fiber materials finished with the compositions according to the invention have good permanence of the effects after washing and dry-cleaning processes, where in the case of oil-, water- and soil-repellent finishes, these effects are often retained even without an ironing operation following cleaning (using the so-called "laundry air dry" or "laundry tumbler dry" processes). The use of compositions according to the invention in the form of aqueous dispersions with ethoxylated castor oil as dispersant produces liquors having excellent stabilities and flow properties. A number of compositions according to the invention are also suitable for the low-felt and low-shrinkage finishing of wool, which, when used together with fluorine-containing polymers, permits simultaneous oil- and water-repellent finishing (in one operation).

The compositions according to the invention are preferably applied to the fiber materials in the form of aqueous dispersions which, in addition to the reaction product obtained in step c), dispersant and water, may also comprise further constituents which have already been specified above. The compositions according to the invention can be applied to the fiber materials using the customary methods known to the person skilled in the art, for example padding, coating, spraying, exhaust methods etc. Particular preference is given to application using a pad mangle. The concentrations which are to be set advantageously can be determined simply by the person skilled in the art. The resulting fiber materials are finished in the customary manner, e.g. by drying.

The invention is illustrated below using working examples.

EXAMPLE 1

Step a): 450 g of component I (2.5 equivalents based on free isocyanate groups) and 33.5 g of 1,1,1-trimethylolpropane (0.75 equivalents based on hydroxyl groups) were dissolved in 720 g of methyl isobutyl ketone at 40° C. with stirring in a four-necked flask fitted with reflux condenser while nitrogen is passed through during the whole batch (steps a) to c)). Component I was a reaction product of an isomer mixture of diphenylmethane diisocyanate with a mixture of 1,2-propylene glycol, dipropylene glycol and tripropylene glycol, the reaction product still comprising about 65% by weight of unreacted diphenylmethane diisocyanate and being essentially free of compounds having free hydroxyl groups. The mixture of isomeric diisocyanates is a mixture of isomeric diphenylmethane diisocyanates, in which the isomer having the largest proportion by weight is 4,4'-diphenylmethane diisocyanate, which mixture is commercially obtainable, for example, from Dow Chemical or Bayer. The alcohol mixture is a mixture of about 5% by weight of 1,2-propylene glycol, 15% by weight of dipropylene glycol and 80% by weight of tripropylene glycol. 0.6 g of dibutyltin dilaurate, dissolved in 5.4 g of methyl isobutyl ketone, were added with stirring to the resulting solution. Within three minutes, the temperature increased to 54° C. The solution was then stirred for a further 30 minutes in a water bath at 42° C.

Step b): 14.9 g of N-methyldiethanolamine (0.25 equivalents based on hydroxyl groups), dissolved in 90 g of methyl isobutyl ketone, were then added to the solution. Within 5 minutes, the temperature increased from 40 to 450. The solution was then stirred for a further 30 minutes in a water bath at 42° C.

Step c): 130.7 g of butanone oxime (1.5 equivalents), dissolved in 125 g of methyl isobutyl ketone, were then added to the solution. Within 1 minute, the temperature increased to 61° C. The solution was then stirred for a further 30 minutes in a water bath at 42° C. This gave a slightly viscous, slightly cloudy product which, according to infrared spectrometer testing, was free from NCO. The product was made up to 1573 g with methyl isobutyl ketone, which corresponded to a content of 40% by weight of active substance.

Step d): 500 g of the solution obtained in step c) (containing 200 g of active substance) were incorporated into a solution comprising 20 g of EMULSOGEN EL
30 g of 1,2-propylene glycol
550 g of tap water, which had been prepared at room temperature, using a high-speed stirrer (Ultra-Turrax) at 20° C. EMULSOGEN EL is an ethoxylated castor oil having, on average, from 36 to 38 ethylene oxide units and can be obtained from Hoechst AG. The pH of the resulting mixture was 6.9. This was adjusted to 2.8 by the dropwise addition of about 30% hydrochloric acid. The mixture was stirred for a further 3 minutes and then homogenized in four passes over a high-pressure homogenizer (manufacturer Manton-Gaulin) at about 250 bar operating pressure. The initial temperature of the mixture was 20° C. and the final temperature of the dispersion obtained after the fourth pass was 35° C.

The solvent methyl isobutyl ketone was then distilled off together with some of the water in a rotary evaporator at a bath temperature of 70° C. under reduced pressure. A dry substance determination was then carried out and the necessary amount of water calculated therefrom added in order to obtain a dispersion having a solids content of 30% by weight. The resulting dispersion had good stability under mechanical and thermal influences.

EXAMPLE 2

Step a): 70 g of 2,4-toluylene diisocyanate (0.8 equivalents based on free isocyanate groups) containing about 5% of the 2,6-isomer and 8 g of 1,1,1-trimethylolpropane (0.18 equivalents based on hydroxyl groups) were dissolved in 175 g of methyl isobutyl ketone at 60° C. with vigorous stirring in a four-necked flask fitted with reflux condenser while nitrogen was passed through during the whole batch (steps a) to c) ). The resulting solution was then cooled to 25° C. 0.2 g of dibutyltin dilaurate, dissolved in 1.8 g of methyl isobutyl ketone, were then added to the solution with stirring. The temperature increased from 25 to 38° C. The solution was then stirred for a further 30 minutes, during which the temperature fell to 28° C.

Step b): 3.5 g of triethanolamine (0.06 equivalents based on hydroxyl groups), dissolved in 30 g of methyl isobutyl ketone, were then added to the solution. The temperature increased to 34° C. The solution was then stirred for a further 30 minutes, during which the temperature fell to 27° C.

Step c): 48.8 g of butanone oxime (0.56 equivalents), dissolved in 40 g of methyl isobutyl ketone, were then added to the solution. The temperature increased to 57° C. The solution was then stirred for a further 30 minutes, during which the temperature fell to 32° C. This gave a slightly viscous, slightly cloudy product, which testing using an infrared spectrometer revealed was free from NCO. The active substance of the resulting solution was 129 g or about 33%.

Step d): All of the solution obtained in step c) was incorporated into a solution comprising 10 g of MARLIPAL O 13/500
3 g of DEHYQUART AU 56
22 g of monoethylene glycol
350 g of tap water, which had been prepared at 35° C., using a high-speed stirrer (Ultra-Turrax) at 35° C. MARLIPAL O 13/500 is an ethoxylated oxo alcohol and can be obtained from Huls AG. DEHYQUART AU 56 is a quaternary ammonium methyl sulfate available from Henkel. The pH of the resulting mixture was 6.1. This was adjusted to 3.2 by the dropwise addition of about 30% hydrochloric acid. The mixture was stirred for a further 3 minutes and then homogenized in 4 passes over a high-pressure homogenizer (manufacturer Manton-Gaulin) at about 250 bar operating pressure. The initial temperature of the mixture was 20° C. and the final temperature of the dispersion obtained after the fourth pass was 35° C.

The solvent methyl isobutyl ketone was then distilled off together with some of the water in a rotary evaporator at a bath temperature of 70° C. under reduced pressure. A dry substance determination was then carried out and the necessary amount of water calculated therefrom added in order to obtain a dispersion having a dry substance content of 30% by weight. The resulting dispersion had good stability under mechanical and thermal influences.

EXAMPLE 3

Step a): 75 g of the component I also used in Example 1 (0.416 equivalents based on free isocyanate groups) and 5.6 g of 1,1,1-trimethylolpropane (0.126 equivalents based on hydroxyl groups) were dissolved in 110 g of methyl isobutyl ketone at 40° C. with stirring in a four-necked flask fitted with reflux condenser while nitrogen was passed through during the whole batch (steps a) to step c)). 0.1 g of dibutyltin dilaurate, dissolved in 0.9 g of methyl isobutyl ketone, were added to the resulting solution with stirring. Within 1 minute, the temperature increased to 55° C. The solution was then stirred for a further 30 minutes in a water bath at 41° C.

Step b): 2.38 g of N-methyldiethanolamine (0.04 equivalents based on hydroxyl groups), dissolved in 40 g of methyl isobutyl ketone, were then added to the solution. Within one minute the temperature increased from 40 to 45° C. The solution was then stirred for a further 30 minutes in a water bath at 41° C.

Step c): 21.75 g of butanone oxime (0.25 equivalents), dissolved in 20 g of methyl isobutyl ketone, were then added to the solution. Within one minute, the temperature increased to 59° C. The solution was then stirred for a further 30 minutes in a water bath at 41° C. This gave a slightly viscous, whitish cloudy product, which infrared spectrometer testing revealed was free from NCO. The product had an active substance content of about 104 g.

Step d): The solution obtained in step c) was incorporated into a solution comprising 5.5 g of EMULSOGEN EL
5.5 g of IMBENTIN T/400 G
16 g of 1,2-propylene glycol
290 g of tap water, which had been prepared at room temperature, using a high-speed stirrer (Ultra-Turrax) at 20° C. IMBENTIN T/400 G is an ethoxylated tridecyl alcohol containing 40 ethylene oxide units and can be obtained from Dr. W. Kolb AG, Hedingen, Switzerland. The pH of the resulting mixture was 5.7. This was adjusted to 2.8 by the dropwise addition of about 30% hydrochloric acid. The mixture was stirred for a further 3 minutes and then homogenized in four passes over a high-pressure homogenizer (manufacturer Manton-Gaulin) at about 250 bar operating pressure without cooling. The initial temperature of the mixture was 20° C. and the final temperature of the dispersion obtained after the fourth pass was 35° C.

The solvent methyl isobutyl ketone was then distilled off together with some of the water in a rotary evaporator at a bath temperature of 70° C. under reduced pressure. A dry substance determination was then carried out and the necessary amount of water calculated therefrom added in order to obtain a dispersion having a dry substance content of 30% by weight. The resulting dispersion had good stability under mechanical and thermal influences.

The invention is illustrated below using application examples. The results were assessed using the test methods described below. Prior to carrying out the tests, the fabric samples were stored at 20° C./65% rel. humidity for 24 hours following finishing.

The oil-repellent effect was determined in accordance with AATCC 118-1978. The wetting by 8 different liquid hydrocarbons was tested; the assessment scale in this test method covers grades from 1 to 8, grade 8 being the best (greatest repellent effect).

The water-repellent effect was determined in accordance with AATCC 22-1980 (spray test) and also in accordance with DIN 53888 (Bundesmann rain test). The latter test involves visually assessing the "bead-off effect" (three times for each fabric, after 1, 5 and 10 minutes' rain time), giving grades from 1 (worst grade) to 5 (best grade: water is repelled without wetting), and then determining the water absorption in % by weight. In the spray test, the wetting is likewise assessed visually, the grades being from 0 to 100 (100=best grade, i.e. lowest wetting). The aforementioned AATCC test methods are taken from the "AATCC (American Association of Textile Chemists and Colorists) Technical Manual" Vol. 58, 1983, pages 248, 270 and 271.

APPLICATION EXAMPLE 1

(according to the invention)

A finishing liquor having the following composition was prepared:

10 g/l of the dispersion obtained in Example 1

40 g/l of a fluorine-containing polymer 5 g/l of surface-active preparation 1 g/l of 60% by weight acetic acid and water as the remainder.

The fluorine-containing polymer used was an aqueous dispersion comprising 15% by weight of a perfluoroalky-lacrylic copolymer and the surface-active preparation used was an aqueous solution of an ethoxylated fatty alcohol and an araliphatic ether alcohol.

The resulting finishing liquor was applied at room temperature to a green wool fabric having a liquor uptake of about 90% by weight, based on the weight of the article, using a pad mangle. The fabric was then dried in a drying cabinet for 10 minutes at 110° C. and then condensed for 5 minutes at 150° C. The fabric was ironed after each washing or dry-cleaning process.

APPLICATION EXAMPLE 2

(according to the invention)

Application Example 1 was repeated, except that the finishing liquor used was 10 g/l of the dispersion obtained in Example 2 instead of the dispersion obtained in Example 1.

APPLICATION EXAMPLE 3

(according to the invention)

Application Example 1 was repeated, except that the finishing liquor used was 10 g/l of the dispersion obtained in Example 3 instead of the dispersion obtained in Example 1.

APPLICATION EXAMPLE 4

(not according to the invention)

Application Example 1 was repeated, except that the finishing liquor used was 10 g/l of a dispersion which comprised 30% by weight of a reaction product of toluylene diisocyanate and trimethylolpropane, the free NCO groups of which had been blocked with butanone oxime (i.e. a product in whose preparation step b) has not been carried out) instead of the dispersion obtained in Example 1.

APPLICATION EXAMPLE 5

(not according to the invention)

Application Example 1 was repeated except that the finishing liquor used was 10 g/l of a dispersion which comprise about 30% by weight of a product obtained from diphenylmethane diisocyanate by blocking the NCO groups using butanone oxime (i.e. a product in whose preparation steps a) and b) have not been carried out) instead of the dispersion obtained in Example 1.

The wool fabrics finished in Application Examples 1 to 5 gave the test results listed in Table 1.

TABLE 1

| | Application Example | | | | |
|---|---|---|---|---|---|
| | No. 1 | No. 2 | No. 3 | No. 4 | No. 5 |
| Original values | | | | | |
| Oil repellency | 6 | 6 | 6 | 6 | 6 |
| Spray test | 100 | 100 | 100 | 100 | 100 |
| Rain | 12% | 12% | 15% | 43% | 24% |
| Bead-off effect | 5/5/5 | 5/5/5 | 5/4/4 | 5/2/2 | 5/4/3 |
| After 5 washes/30° C. | | | | | |
| Oil repellency | 6 | 6 | 6 | 5 | 6 |
| Spray test | 100 | 100 | 100 | 100 | 100 |
| Rain | 31% | 35% | 28% | 54% | 42% |
| Bead-off effect | 5/2/2 | 5/2/2 | 3/3/3 | 2/1/0 | 3/2/1 |
| After 1 dry-cleaning treatment with cleaning promoter | | | | | |
| Oil repellency | 6 | 6 | 6 | 6 | 6 |
| Spray test | 100 | 100 | 100 | 90 | 100 |
| Rain | 37% | 34% | 23% | 49% | 40% |
| Bead-off effect | 3/2/2 | 5/3/2 | 5/4/3 | 2/1/0 | 3/2/1 |

APPLICATION EXAMPLE 6

(according to the invention)

A finishing liquor having the following composition was prepared:

30 g/l of the dispersion obtained in Example 1

70 g/l of a fluorine-containing polymer 5 g/l of a surface-active preparation 1 g/l of 60% by weight acetic acid 15 g/l of an alkyl-modified melamine-formaldehyde derivative 5 g/l of acid donor based on magnesium salt and water as the remainder The fluorine-containing polymer used was an aqueous dispersion comprising 12.5% by weight of a perfluoroalky-lacrylic copolymer and the surface-active preparation used was an aqueous solution of an ethoxylated fatty alcohol and an araliphatic ether alcohol.

The resulting finishing liquor was applied at room temperature to a fabric made of a polyester/cotton (65%:35%) mix having a liquor uptake of about 62% by weight, based on the weight of the article, using a pad mangle. The fabric was then dried in a drying cabinet for 10 minutes at 110° C. and then condensed for 5 minutes at 150° C. The fabric was ironed after each washing or dry-cleaning process.

APPLICATION EXAMPLE 7
(according to the invention)

Application Example 6 was repeated, except that the finishing liquor used was 30 g/l of the dispersion obtained in Example 2 instead of the dispersion obtained in Example 1.

APPLICATION EXAMPLE 8
(according to the invention)

Application Example 6 was repeated, except that the finishing liquor used was 30 g/l of the dispersion obtained in Example 3 instead of the dispersion obtained in Example 1.

APPLICATION EXAMPLE 9
(not according to the invention)

Application Example 6 was repeated, except that the finishing liquor used was 30 g/l of a dispersion which comprised 30% by weight of a reaction product of toluylene diisocyanate and trimethylolpropane, the free NCO groups of which had been blocked with butanone oxime (i.e. a product in whose preparation step b) has not been carried out) instead of the dispersion obtained in Example 1.

APPLICATION EXAMPLE 10
(not according to the invention)

Application Example 6 was repeated, except that the finishing liquor used was 30 g/l of a dispersion which comprised about 30% by weight of a product obtained from diphenylmethane diisocyanate by blocking the NCO groups using butanone oxime (i.e. a product in whose preparation steps a) and b) have not been carried out) instead of the dispersion obtained in Example 1.

The cotton/polyester fabrics finished in application Examples 6 to 10 gave the test results listed in Table 2.

TABLE 2

| | Application Example | | | | |
|---|---|---|---|---|---|
| | No. 6 | No. 7 | No. 8 | No. 9 | No. 10 |
| Original values | | | | | |
| Oil repellency | 6 | 6 | 6 | 6 | 6 |
| Spray test | 100 | 100 | 100 | 100 | 100 |
| Rain | 4% | 6% | 7% | 19% | 22% |
| Bead-off effect | 5/5/5 | 5/5/5 | 5/5/5 | 4/4/4 | 4/4/4 |
| After 10 washes/60° C. | | | | | |
| Oil repellency | 6 | 6 | 6 | 5 | 4 |
| Spray test | 100 | 100 | 100 | 70 | 80 |
| Rain | 7% | 8% | 12% | 21% | 22% |
| Bead-off effect | 4/3/3 | 4/3/3 | 4/4/3 | 1/0/0 | 1/0/0 |
| After 3 dry-cleaning operations with cleaning promoter | | | | | |
| Oil repellency | 6 | 6 | 6 | 6 | 5 |
| Spray test | 100 | 100 | 100 | 100 | 100 |
| Rain | 5% | 6% | 6% | 21% | 28% |
| Bead-off effect | 5/5/5 | 5/5/5 | 5/5/5 | 3/3/3 | 2/1/0 |

APPLICATION EXAMPLE 11
(according to the invention)

A finishing liquor having the following composition was prepared:

6 g/l of the dispersion obtained in Example 1
30 g/l of a fluorine-containing polymer
2 g/l of 60% by weight acetic acid
and water as the remainder.

The fluorine-containing polymer used was an aqueous dispersion comprising 15% by weight of a perfluoroalkylacrylic copolymer.

The resulting finishing liquor was applied at room temperature to polyester taffeta having a liquor uptake of about 45% by weight, based on the weight of the article, using a pad mangle. The fabric was then dried in a drying cabinet for 10 minutes at 110° C. and then condensed at 150° C. for 5 minutes. To determine the LAD and LDT properties (LAD stands for "Laundry Air Dry" and LTD for "Laundry Tumbler Dry"), the finished fabric was in each case after washing dried in the air or in a tumble dryer for 20 to 25 minutes at 65° C.

APPLICATION EXAMPLE 12
(according to the invention)

Application Example 11 was repeated, except that the finishing liquor used was 30 g/l of the dispersion obtained in Example 2 instead of the dispersion obtained in Example 1.

APPLICATION EXAMPLE 13
(not according to the invention)

Application Example 11 was repeated, except that the finishing liquor used was 30 g/l of a dispersion comprising 30% by weight of a reaction product of toluylene diisocyanate and trimethylolpropane, the free NCO groups of which had been blocked with butanone oxime (i.e. a product in whose preparation step b) has not been carried out) instead of the dispersion obtained in Example 1.

APPLICATION EXAMPLE 14
(not according to the invention)

Application Example 11 was repeated, except that the finishing liquor used was 30 g/l of a dispersion comprising about 30% by weight of a product obtained from diphenylmethane diisocyanate by blocking the NCO groups using butanone oxime (i.e. a product in whose preparation steps a) and b) have not been carried out) instead of the dispersion obtained in Example 1.

The fabric made of polyester taffeta finished in Application Examples 11 to 14 gave the test results listed in Table 3.

TABLE 3

| | Application Example | | | |
|---|---|---|---|---|
| | No. 11 | No. 12 | No. 13 | No. 14 |
| Original values | | | | |
| Oil repellency | 6 | 6 | 6 | 6 |
| Spray test | 100 | 100 | 100 | 100 |
| Rain | 0% | 0% | 1% | 0% |
| Bead-off effect | 4/4/4 | 4/4/4 | 4/4/4 | 5/5/5 |
| After 1 wash/40° C., air-dried | | | | |
| Oil repellency | 4 | 3 | 2 | 2 |
| Spray test | 100 | 100 | 80 | 100 |
| Rain | 1% | 1% | 10% | 3% |
| Bead-off effect | 4/4/4 | 4/4/3 | 2/2/2 | 4/4/3 |
| After 5 washes/40° C., air-dried | | | | |
| Oil repellency | 2 | 2 | 0 | 1 |
| Spray test | 90 | 90 | 70 | 90 |
| Rain | 9% | 6% | 21% | 15% |
| Bead-off effect | 2/2/2 | 2/2/2 | 1/0/0 | 1/0/0 |
| After 5 washes/40° C., tumbler-dried | | | | |
| Oil repellency | 3 | 3 | 2 | 3 |

TABLE 3-continued

| | Application Example | | | |
|---|---|---|---|---|
| | No. 11 | No. 12 | No. 13 | No. 14 |
| Spray test | 100 | 100 | 90 | 100 |
| Rain | 3% | 1% | 14% | 4% |
| Bead-off effect | 3/3/3 | 4/4/4 | 2/2/2 | 3/3/3 |

It is clear from Application Examples 1 to 14 that the compositions according to the invention impart excellent oil- and water-repellent properties to a variety of fiber materials, the properties which are better retained even after several washing or cleaning operations than is the case for non-inventive compositions, even if the fabrics are not ironed after washing.

APPLICATION EXAMPLE 15
(according to the invention)

Two finishing liquors having the following composition were prepared:

a) 50 g/l of the dispersion obtained in Example 1 and water as the remainder.
b) 100 g/l of the dispersion obtained in Example 1 and water as the remainder.

The resulting finishing liquors were each applied at room temperature to a green wool fabric having a liquor uptake of about 90% by weight, based on the weight of the article, using a pad mangle. The fabrics were then dried in a drying cabinet for 10 minutes at 110° C. and then condensed for 5 minutes at 150° C.

The surface shrinkage after 5 A washes (in accordance with ISO 6330-1984) was measured for the fabrics treated in this way.

APPLICATION EXAMPLE 16
(according to the invention)

Application Example 15 was repeated, except that the finishing liquors used were 50 and 100 g/l respectively of the dispersion obtained in Example 2 instead of the dispersion obtained in Example 1.

APPLICATION EXAMPLE 17
(not according to the invention)

Application Example 15 was repeated, except that the finishing liquors used were 50 and 100 g/l respectively of a dispersion comprising 30% by weight of a reaction product of toluylene diisocyanate and trimethylolpropane, the free NCO groups of which had been blocked with butanone oxime, instead of the dispersion obtained in Example 1.

APPLICATION EXAMPLE 18
(not according to the invention)

Application Example 15 was repeated, except that the finishing liquors used were 50 and 100 g/l respectively of a dispersion comprising about 30% by weight of a product obtained from diphenylmethane diisocyanate by blocking the NCO groups with butanone oxime, instead of the dispersion obtained in Example 1.

APPLICATION EXAMPLE 19
(not according to the invention)

The surface shrinkage after 5 A washes (in accordance with ISO 6330-1984) was measured for the untreated wool fabric.

The finished wool fabrics in Application Examples 15 to 18 and the untreated wool fabric had the shrinkages (in %) after 5 A washes (in accordance with ISO 6330-1984) listed in Table 4.

TABLE 4

| | | Application Example | | | | |
|---|---|---|---|---|---|---|
| | | No. 15 | No. 16 | No. 17 | No. 18 | No. 19 |
| Liquor a) | width/weft | 3 | 5 | 7 | 7.5 | 14 |
| | length/warp | 5 | 6.5 | 8 | 8 | 14 |
| Liquor b) | width/weft | 2 | 4 | 4 | 7.5 | |
| | length/warp | 2.5 | 5 | 5 | 7.5 | |

It can be seen from application examples 15 to 19 that the compositions according to the invention reduce the surface-shrinkage of wool through washing and in some cases markedly so.

What is claimed is:

1. A composition for the oil-, water- and soil-repellent finishing in combination with fluorine-containing polymers, of fiber materials, which is obtained by the following process steps:

a) reacting a diisocyanate or a mixture of diisocyanates (component I) with one or more alcohols having from 2 to 8 carbon atoms and/or with one or more mono- and/or diethers of such alcohols (component II), these alcohols or ethers thereof having at least two alcoholic hydroxyl groups and no more than two C—O—C bonds, and the reaction being carried out such that the product formed still has free isocyanate groups, b) reacting the product obtained in step a) with an organic amine containing two or more alcoholic hydroxyl groups, or a mixture of such amines, the reaction being carried out such that the product formed still has free isocyanate groups, with the proviso that at least one alcohol, one ether or one amine from amongst the alcohols, ethers and amines used in step a) and/or b) contains three or more alcoholic hydroxyl groups, c) blocking the free isocyanate groups of the product obtained in step b) by reaction with a blocking agent, d) dispersing the product obtained after step c) in water using one or more dispersants and adjusting the pH.

2. A composition according to claim 1, wherein the reaction in step a), step b) and/or the blocking in step c) is carried out in a homogeneous liquid phase.

3. A composition according to claim 2, wherein the reaction in step a), step b) and/or the blocking in step c) is carried out in a solvent and, optionally, the solvent is removed.

4. A composition according to claim 3, wherein the solvent used is a ketone.

5. A composition according to claim 1 wherein the reaction in step a), step b) and/or the blocking in step c) is carried out in the presence of a catalyst.

6. A composition according to claim 1, wherein, in step a), from 0.1 to 0.5 equivalents of alcoholic hydroxyl groups are used per equivalent of isocyanate groups, and in step b), from 0.05 to 0.5 equivalents of alcoholic hydroxyl groups are used per equivalent of isocyanate groups used in step a).

7. A composition according to claim 1, wherein, ir step a), from 0.3 to 0.5 equivalents of alcoholic hydroxyl groups are used per equivalent of isocyanate groups and, in step b), from 0.05 to 0.3 equivalents of alcoholic hydroxyl groups are used per equivalent of isocyanate groups used in step a), in which case the sum of the equivalents of alcoholic hydroxyl groups used in step a) and b) does not exceed 0.7 per equivalent of isocyanate groups used in step a).

8. A composition according to claim 1, wherein, in step a), an aromatic diisocyanate or a mixture of such isocyanates is used.

9. A composition according to claim 1, wherein, in step a), diphenylmethane 4,4'-diisocyanate or a toluylene diisocyanate or a mixture of such isocyanates is used.

10. A composition according to claim 1, wherein the organic amine used in step b) is a compound of the general formula (A)

$$R_{3-y}N(R'\text{—}OH)_y \tag{A}$$

in which R is an alkyl radical having from 1 to 18 carbon atoms, R' is a linear or branched alkylene radical having from 2 to 4 carbon atoms and y is 2 or 3.

11. A composition according to claim 10, wherein the amine used is N-methyldiethanolamine or triethanolamine.

12. A composition according to claim 1, wherein component II used in step a) is 1,1,1-trimethylolpropane or 1,2-propylene glycol or a mixture of 1,2-propylene glycol and one or more mono- or diethers of 1,2-propylene glycol.

13. A composition according to claim 1, wherein as component I in step a) a diisocyanate or a mixture of diisocyanates is used in the presence of a reaction product containing free isocyanate groups which is obtained by reaction of this diisocyanate or diisocyanate mixture with a dihydric alcohol or with a mixture of such an alcohol and mono- and/or diethers of such an alcohol.

14. A composition according to claim 1, wherein component I used in step a) is a mixture of a diisocyanate and a reaction product containing free isocyanate groups which is obtained by reaction of this diisocyanate with 1,2-propylene glycol or with a mixture of 1,2-propylene glycol and one or more mono- or diethers of 1,2-propylene glycol.

15. A composition according to claim 14, wherein the mixture of diisocyanate and its reaction product has been obtained by reaction of diisocyanate with 1,2-propylene glycol or with a mixture of 1,2-propylene glycol and one or more mono- or diethers of 1,2-propylene glycol in a ratio of one equivalent of isocyanate groups to from 0.1 to 0.3 equivalents of alcoholic hydroxyl groups.

16. A composition according to claim 1, wherein the reaction in step a) and b) is carried out in a temperature range of from 0 to 150° C.

17. A composition according to claim 1, wherein the blocking in step c) is carried out in a temperature range of from 0 to 100° C.

18. A composition according to claim 1, wherein the blocking agent used in step c) is a ketone oxime.

19. A composition according to claim 1, wherein, in step a), component I is reacted with a tri- or polyhydric alcohol to give a product which still contains free isocyanate groups, and the resulting product is then reacted, in step b), with a compound of the formula (B), $$R''N(CH_2CH_2OH)_2 \tag{B}$$

in which R" is an alkyl group having from 1 to 4 carbon atoms, to give a product which still contains free isocyanate groups.

20. A composition according to claim 1, wherein in step an ethoxylated castor oil having, on average, from 10 to 50 ethylene oxide units is used as the dispersant.

* * * * *